United States Patent
Todasco

(10) Patent No.: US 10,805,470 B2
(45) Date of Patent: *Oct. 13, 2020

(54) VOICE-CONTROLLED AUDIO COMMUNICATION SYSTEM

(71) Applicant: PAYPAL, INC., San Jose, CA (US)

(72) Inventor: Michael C. Todasco, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,163

(22) Filed: Aug. 7, 2018

(65) Prior Publication Data

US 2019/0075205 A1 Mar. 7, 2019

Related U.S. Application Data

(63) Continuation of application No. 15/197,077, filed on Jun. 29, 2016, now Pat. No. 10,044,869.

(51) Int. Cl.
*H04M 1/64* (2006.01)
*H04M 3/533* (2006.01)
*G10L 15/22* (2006.01)
*G10L 17/00* (2013.01)

(52) U.S. Cl.
CPC ......... *H04M 3/53366* (2013.01); *G10L 15/22* (2013.01); *H04M 3/53333* (2013.01); *G10L 17/00* (2013.01); *G10L 2015/223* (2013.01); *H04M 2203/45* (2013.01); *H04M 2203/6045* (2013.01); *H04M 2242/12* (2013.01)

(58) Field of Classification Search
CPC .......... H04M 3/53333; H04M 3/53366; G10L 15/22

USPC .......... 379/88.03, 88.04, 88.14, 67.1, 88.19, 379/88.22–88.26; 345/156; 455/424, 455/412.1

See application file for complete search history.

(56) References Cited

U.S. PATENT DOCUMENTS

| | | | | |
|---|---|---|---|---|
| 8,032,118 B1 * | 10/2011 | Othmer | ............. | H04M 3/53358 455/412.1 |
| 10,609,199 B1 * | 3/2020 | Haskin | ................ | H04M 1/7253 |
| 2007/0036292 A1 * | 2/2007 | Selbie | ..................... | H04L 51/04 379/88.14 |
| 2008/0096545 A1 * | 4/2008 | Delean | .................. | H04W 40/20 455/424 |
| 2016/0109954 A1 * | 4/2016 | Harris | ..................... | G06F 3/017 345/156 |

FOREIGN PATENT DOCUMENTS

GB 2496588 A * 5/2013 ........ H04M 3/42357

* cited by examiner

*Primary Examiner* — Md S Elahee
(74) *Attorney, Agent, or Firm* — Haynes and Boone, LLP

(57) ABSTRACT

Systems and methods for providing an audio communication system include receiving from a first user, by a microphone of a first voice-controlled device of a plurality of voice-controlled devices in an audio communication system, a first audio message and an audio command to provide the audio message to a second user. An identity of the second user associated with a user profile based on the audio command is determined. The first audio message is provided to a second voice-controlled device of the plurality of voice-controlled devices to output the audio message at a speaker of the voice-controlled device to the second user that is proximity to the second voice-controlled device.

20 Claims, 10 Drawing Sheets

VOICE-CONTROLLED AUDIO COMMUNICATION SYSTEM

CROSS-REFERENCE TO RELATED APPLICATIONS

This is a Continuation application to U.S. Utility application Ser. No. 15/197,077, filed Jun. 29, 2016, entitled "VOICE-CONTROLLED AUDIO COMMUNICATION SYSTEM," now U.S. Pat. No. 10,044,869, Issued On Aug. 7, 2018, the disclosure of which is incorporated herein by reference in its entirety.

BACKGROUND

Field of the Disclosure

The present disclosure generally relates to content broadcasting and more particularly to audio communication through a voice-controlled device.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Homes and other environments are being "automated" with the introduction of interconnected computing devices that perform various tasks. Many of these computing devices are voice-controlled such that a user may interact with the voice-controlled computing devices via speech. The voice-controlled computing devices may capture spoken words and other audio input through a microphone, and perform speech recognition to identify voice commands within the audio inputs. The voice-controlled computing devices may then use the voice commands to perform various tasks such as purchasing items and services over electronic networks with the aid of an on-line or mobile payment service provider. The voice-controlled computing devices may also include artificial intelligence that allows them to interact with the user by providing audio responses to the user via a speaker system. However, conventional user interactions with voice-controlled computing devices are limited to communication between the voice-controlled computing device and the user. As such, when users are having difficulty completing a purchase with a merchant and/or using a payment service provider, they are required to contact the merchant and/or the payment service provider by some other communication mechanism such as a phone, email, or instant messaging.

Thus, there is a need for an improved voice-controlled computing device.

Figure 1:
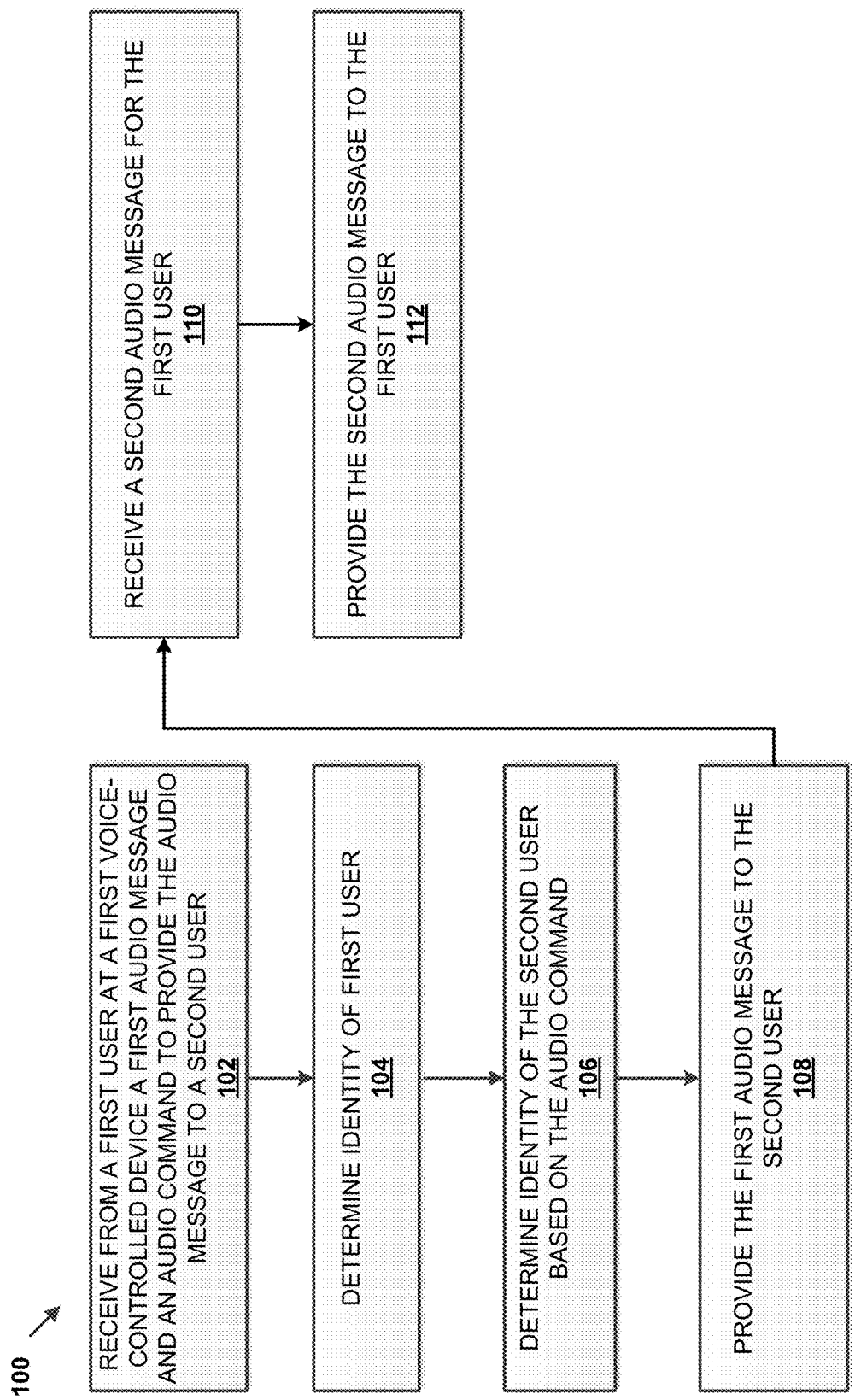
FIG. 1 is a flow chart illustrating an embodiment of a method for audio communication through a voice-controlled device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a voice-controlled audio communication system and method for voice-controlled audio communication. The voice-controlled audio communication system includes one or more voice-controlled devices that are configured to capture audio signals from a surrounding location via a microphone system, and output sound via a speaker system. The voice-controlled device may be configured to perform various tasks such as providing music, news, weather, traffic reports, audiobooks, and/or other audio content through the speaker system, completing online purchases, performing home automation services, and/or providing any of the other tasks discussed below by detecting audio commands from a user within an audio signal generated in response to user speech, and processing those audio commands with speech recognition techniques to cause one or more of the tasks to be performed. As discussed above, current voice-controlled computing devices are limited to performing interactions between the voice-controlled computing device and the user.

The present disclosure provides an improved voice-controlled audio communication system that includes voice-controlled devices that are configured to capture audio commands from a first user to cause an audio message to be communicated to a second user. A first voice-controlled device and/or a messaging service provider device in communication with a plurality of voice-controlled devices may determine the identity of the second user based on the audio command from the first user that provided the audio message. The first voice-controlled device, the messaging service provider device, and/or a second voice-controlled device may determine when the second user is in proximity of a voice-controlled device that is part of the voice-controlled audio communication system and, in response, may provide the audio message to the second user through the voice-controlled device that is in proximity to the second user. Likewise, the second user may respond to the first user's audio message with an audio message reply by providing an audio command and the audio message reply to the voice-controlled device that is in the proximity of the second user. As such, the voice-controlled audio communication system described herein provides for a communication system where users may communicate with each other in real-time when both users are in proximity of any voice-controlled device in the voice-controlled audio communication system. Furthermore, the voice-controlled audio communication system may be configured as a messaging service such that a second user may receive an audio message that was previously provided by a first user when the second user comes in proximity to any voice-controlled device in the voice-controlled audio communication system.

Referring now to FIGS. 1, 2, 3, 4, 5, and 6, a method 100 for communication through a voice-controlled audio communication system is illustrated. In some embodiments of the method 100 described below, one or more messaging service provider devices and/or one or more voice-controlled devices may operate to perform or enable the method 100. For example, a distributed group of devices may operate to maintain the voice-controlled audio communication system discussed below by storing identifiers for users of the voice-controlled audio communication system, determining when the users come in proximity to one of the voice-controlled devices, storing and providing audio messages for identified users, and/or otherwise performing actions that provide the voice-controlled audio communication system utilized in the method 100 as detailed below. In a specific example, a service provider such as, for example, PayPal, Inc. of San Jose, Calif., may provide a messaging service provider device to perform the method 100 discussed below, and in some embodiments may operate in cooperation with one or more other system providers (via their system provider devices) and users (via their voice-controlled devices and other user devices) to perform the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
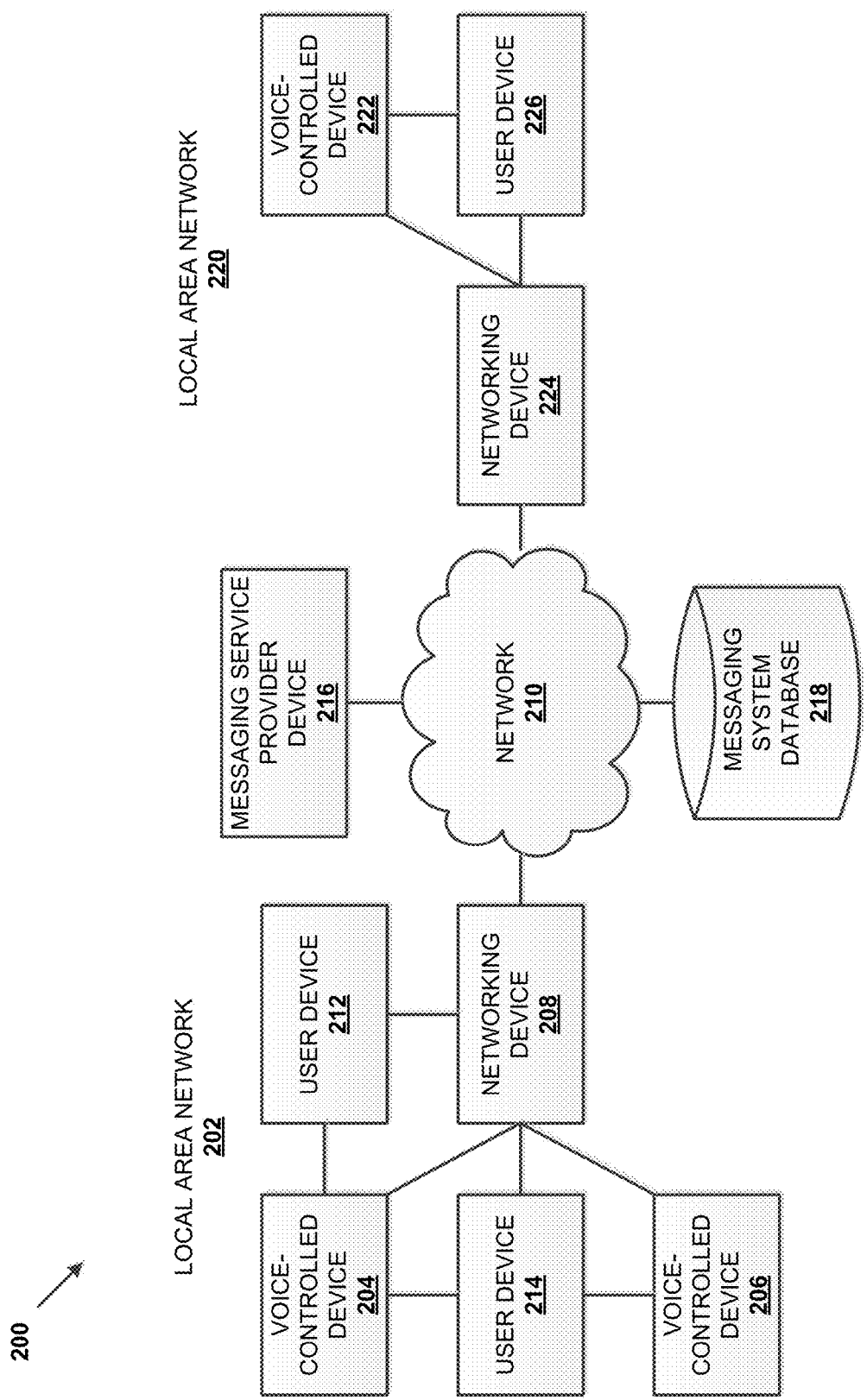
FIG. 2 is a schematic view illustrating an embodiment of a voice-controlled audio communication system.

Referring now to FIG. 2, an embodiment of a voice-controlled audio communication system 200 is illustrated and described briefly for reference in the method 100 discussed below. In an embodiment, the voice-controlled audio communication system 200 may include a first local area network (LAN) 202. The first LAN 202 may include a voice-controlled device such as a first voice-controlled device 204. However, the first LAN 202 may include any number of voice-controlled devices (e.g., a second voice-controlled device 206) each coupled together through the first LAN 202. The first LAN 202 may also include a networking device 208 configured to provide communications between the voice-controlled devices 204 and 206 as well as a wide area network 210. In an embodiment, the networking device 208 may be a wireless access point that provides wireless communications between devices of the first LAN 202 via wireless communication technologies such as Wi-Fi, Bluetooth, or any wireless standard known in the art. The networking device 208 may be configured with one or more service set identifiers (SSID) to function as a local network for any particular user or set of users.

The first LAN 202 may also include one or more user devices (e.g., a user device 212 and a user device 214), which may be configured to communicate with the voice-controlled devices 204, 206 directly and/or via the networking device 208. The devices in the LAN 202 (e.g., the voice-controlled devices 204 and 206, and the user devices 212 and 214) may be coupled through the network 210 via the networking device 208 with a messaging service provider system that includes a messaging service provider device 216 and a messaging system database 218. In an embodiment, the devices in the LAN 202 (e.g., the voice-controlled devices 204 and 206, and the user devices 212 and 214) may be coupled through the network 210 via the networking device 208 and a networking device 224 with a second LAN 220 that includes at least one voice-controlled device 222, as well as a user device 226. While specific example of the voice-controlled audio communication system 200 is illustrated, one of skill in the art in possession of the present disclosure will recognize that a wide variety of voice-controlled audio communication systems having various configurations of networks and voice-controlled devices may operate to provide the systems and methods discussed herein without departing from the scope of the present disclosure.

Figure 3:
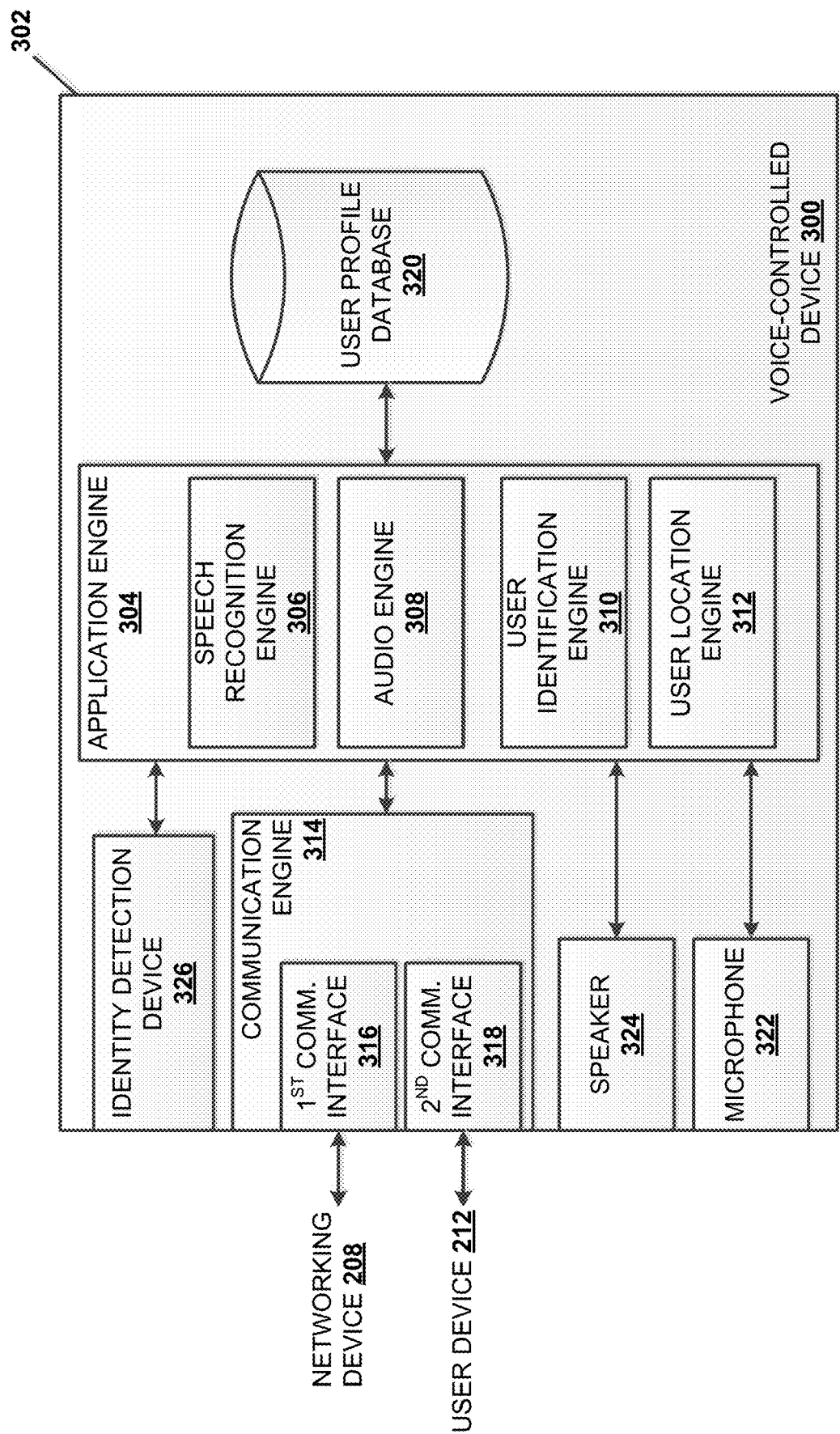
FIG. 3 is a schematic view illustrating an embodiment of a voice-controlled device.

Referring now to FIG. 3, an embodiment of a voice-controlled device 300 is illustrated that may be any or all of the voice-controlled devices 204, 206, and 222 discussed above with reference to FIG. 2, and which may include a voice-enabled wireless speaker system, a home appliance, a desktop computing system, a laptop/notebook computing system, a tablet computing system, a mobile phone, a set-top box, a vehicle audio system, and/or other voice-controlled devices known in the art. In the illustrated embodiment, the voice-controlled device 300 includes a chassis 302 that houses the components of the voice-controlled device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304 that is configured to perform the functions of the application engines and/or the voice-controlled devices 300 discussed below. In the specific example illustrated in FIG. 3, the application engine 304 is configured to provide a speech recognition engine 306, an audio engine 308, a user identification engine 310, and a user location engine 312 that perform the functionality discussed below, although one of skill in the art in possession of the present disclosure will recognize that other applications and computing device functionality may be enabled by the application engine 304 as well.

The chassis 302 may further house a communication engine 314 that is coupled to the application engine 304 (e.g., via a coupling between the communication engine 314 and the processing system). The communication engine 314 may include software or instructions that are stored on a computer-readable medium and that allow the voice-controlled device 300 to send and receive information over the networks discussed above. For example, the communication engine 314 may include a first communication interface 316 to provide for communications through the networking device 208 to networks 202 and 210 as detailed below. In an embodiment, the first communication interface 316 may be a wireless antenna that is configured to provide communications with IEEE 802.11 protocols (Wi-Fi). In other examples, the first communication interface 316 may provide wired communications (e.g., Ethernet protocol) from the voice-controlled device 300 and through the networking device 208 to networks 202 and 210. The communication engine 314 may also include a second communication interface 318 that is configured to provide direct communication with user devices 212 and 214 and/or other voice-controlled devices. For example, the second communication interface 318 may be configured to operate according to wireless protocols such as Bluetooth®, Bluetooth® Low Energy (BLE), near field communication (NFC), infrared data association (IrDA), ANT, Zigbee, and other wireless communication protocols that allow for direct communication between devices.

The chassis 302 may also house a user profile database 320 that is coupled to the application engine 304 through the processing system. The user profile database 320 may store user profiles that include user information, user preferences, user device identifiers, contact lists, and/or other information used by the application engine 304 to determine an identity of a user interacting with or in proximity of the voice-controlled device 300, to determine an identity of a user that is to receive an audio message based on an audio command, and/or to perform any of the other functionality discussed below. While the user profile database 206 has been illustrated as housed in the chassis 302 of the voice-controlled device 300, one of skill in the art will recognize that it may be connected to the application engine 304 through the networking device 208 without departing from the scope of the present disclosure.

The chassis 302 may also house a microphone 322, a speaker 324, and in some embodiments, an identity detection device 326. For example, the microphone 322 may include an array of microphones that are configured to capture sound from a surrounding location of the voice-controlled device 300, and generate audio signals to be processed. The array of microphones may be used to determine a direction of a user speaking to the voice-controlled device 300. Similarly, the speaker 324 may include an array of speakers that are configured to receive audio signals from the audio engine 308, and output sound to the surrounding location of the voice-controlled device 300. The array of speakers may be used to output sound in the direction of the user speaking to the voice-controlled device 300. The identity detection device 326 may be a camera, a motion sensor, a thermal sensor, a fingerprint scanner, and/or any other device that may be used to gather information from a surrounding location of the voice-controlled device 300 for use in identifying a user. The identity detection device 326 may be used by the user identification engine 310 and user location engine 312 to identify users and determine positions of users in relation to the voice-controlled device 300. While specific example of the voice-controlled device 300 is illustrated, one of skill in the art in possession of the present disclosure will recognize that a wide variety of voice-controlled devices having various configurations of components may operate to provide the systems and methods discussed herein without departing from the scope of the present disclosure.

Figure 4:
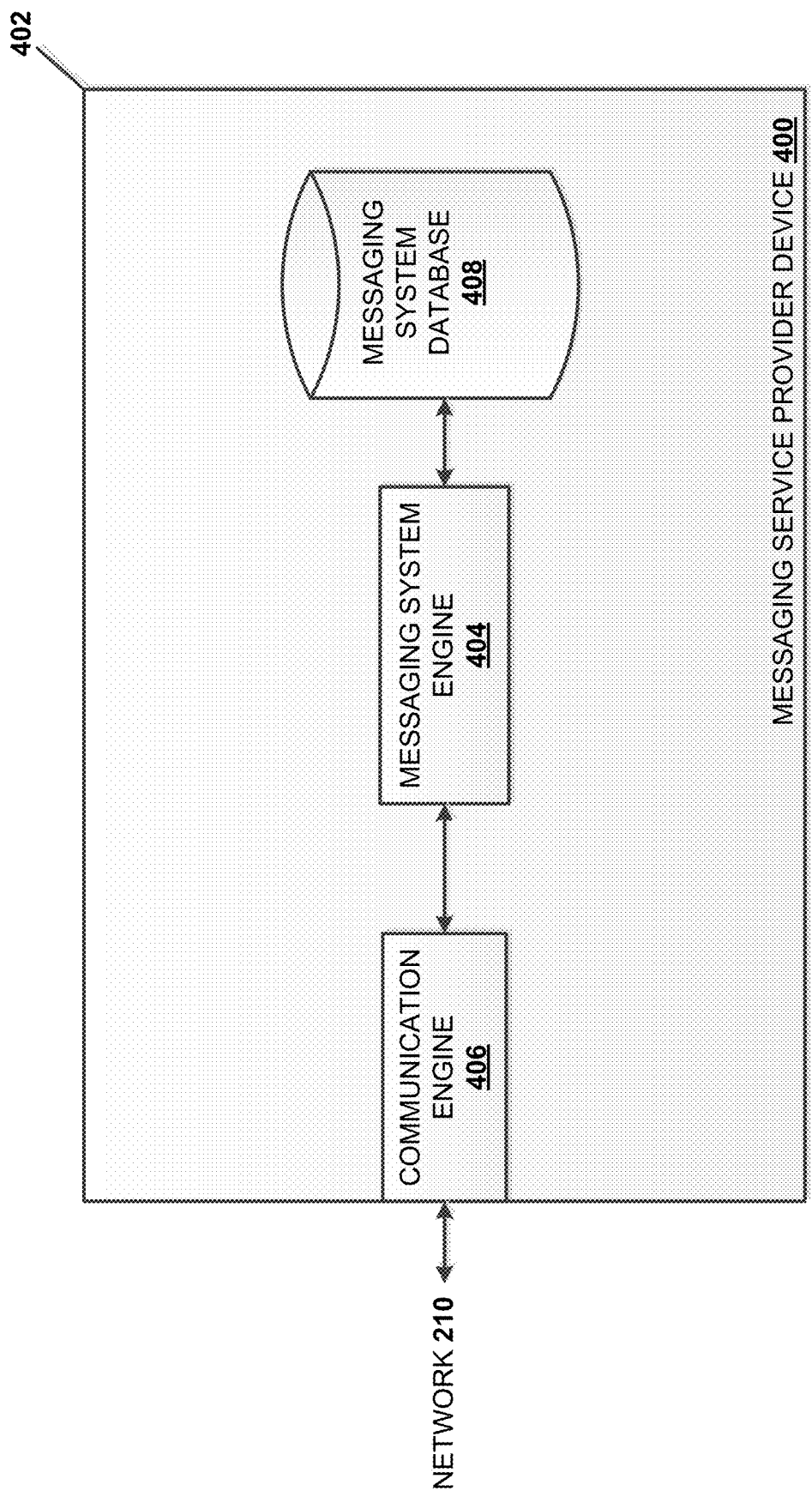
FIG. 4 is a schematic view illustrating an embodiment of a messaging service provider system.

Referring now to FIG. 4, an embodiment of a messaging service provider device 400 is illustrated. In an embodiment, the messaging service provider device 400 may be the messaging service provider device 216 discussed above with reference to FIG. 2. In the illustrated embodiment, the messaging service provider device 400 includes a chassis 402 that houses the components of the messaging service provider device 400, only some of which are illustrated in FIG. 4. For example, the chassis 402 may house a processing system (not illustrated) and a non-transitory memory system (not illustrated) that includes instructions that, when executed by the processing system, cause the processing system to provide a messaging system engine 404 that is configured to perform the functions of the messaging system engines and/or messaging service provider devices discussed below. In a specific example, the messaging system engine 404 may be configured to identify users and track user proximity to voice-controlled devices, store and provide audio messages, and provide any of the other functionality that is discussed below.

The chassis 402 may further house a communication engine 406 that is coupled to the messaging system engine 404 (e.g., via a coupling between the communication system 406 and the processing system) and that is configured to provide for communication through the network as detailed below. The communication engine 406 may allow the messaging service provider device 400 to send and receive information over the network 210. The chassis 402 may also house a messaging system database 408 that is coupled to the messaging system engine 404 through the processing system. The messaging system database 408 may store audio messages, user profiles, user identifiers, tracking data of users in proximity of a voice-controlled device, and/or other data used by the messaging system engine 404 to provide audio messages between one or more voice-controlled devices. While the messaging system database 408 has been illustrated as housed in the chassis 402 of the messaging service provider device 400, one of skill in the art will recognize that the messaging system database 408 may be the messaging system database 218 of FIG. 2 and connected to the messaging system engine 404 through the network 210 without departing from the scope of the present disclosure.

Referring back to FIG. 1, the method 100 of providing audio messages through a voice-controlled audio communication system begins at block 102 where a first voice-controlled device receives, from a first user, a first audio message and an audio command to provide the audio message to a second user. In an embodiment, the first voice-controlled device may be the voice-controlled device 300, and at block 102 the voice-controlled device 300 may monitor a surrounding location for any audio commands. For example, the microphone 322 of the voice-controlled device 300 may capture sound from a surrounding location and may generate audio signals based on that sound, and those audio signals may then be provided to the speech recognition engine 306. The speech recognition engine 306 may then analyze the audio signals and further determine that the first user is providing an audio command to the voice-controlled device 300.

In a specific example, the first user may speak a predefined word or words, may make a predefined sound, or provide some other audible noise that, when recognized by the speech recognition engine 306, indicates to the speech recognition engine 306 that the user is going to provide an audio command to the voice-controlled device 300. The speech recognition engine 306 may determine that the audio command includes an instruction to provide an audio message to a second user. In some embodiments, the second user and the first user may be the same user in cases where a user wishes to record a message for playback at a later time (e.g., a "reminder"). The audio command may include the audio message, or the voice-controlled device 300 may prompt the first user to provide the audio message after the voice-controlled device 300 recognizes the audio command and is ready to record the audio message. The audio message may be captured as a recorded audio file of the first user's voice. However, in some embodiments, the voice-controlled device 300 may convert the audio message to text, which then may be converted back to an audio signal in the form of a computer generated voice rather than the voice of the first user.

Figure 5:
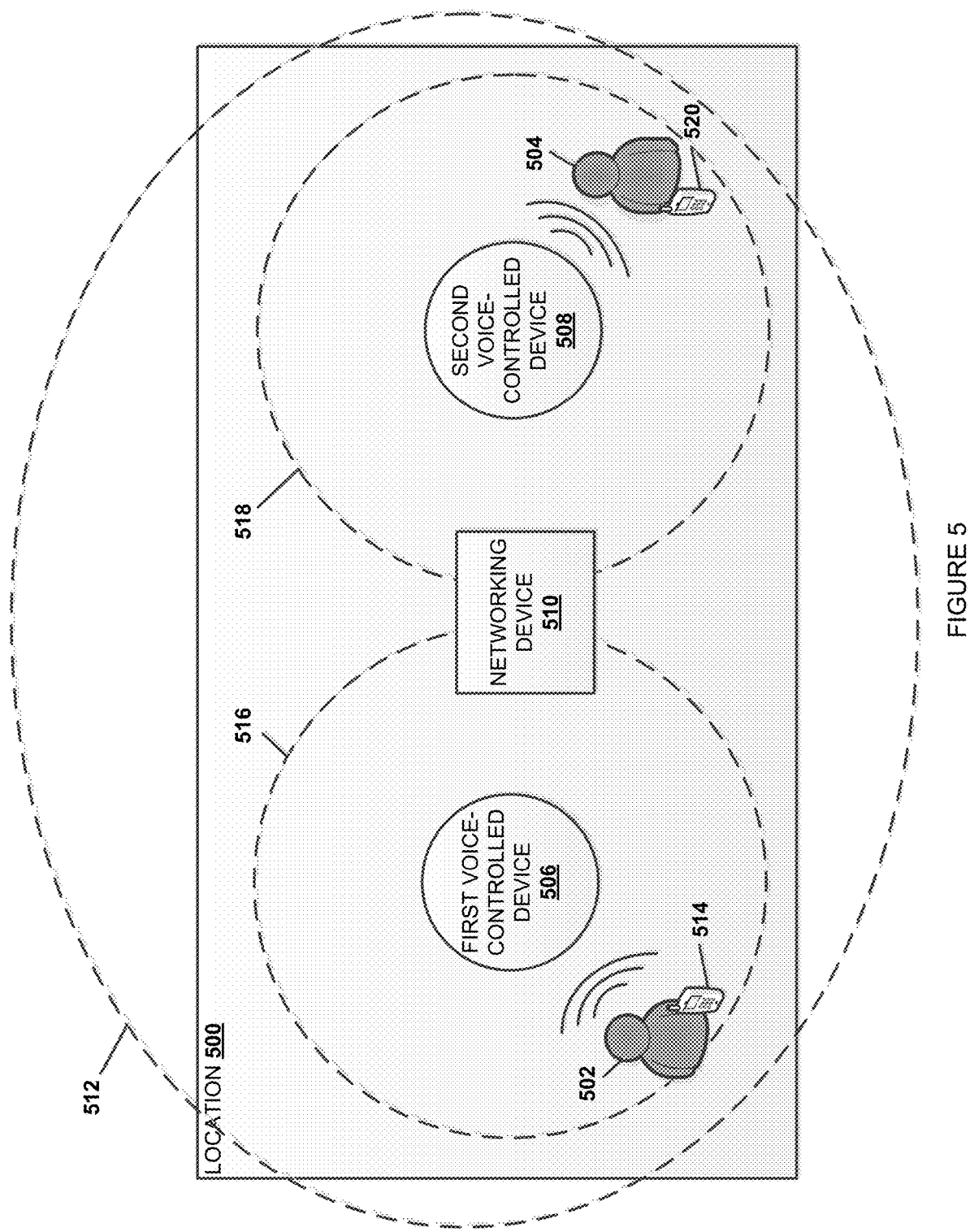
FIG. 5 is a block diagram illustrating an embodiment of an example use of the voice-controlled audio communication system over a local network.
Figure 6:
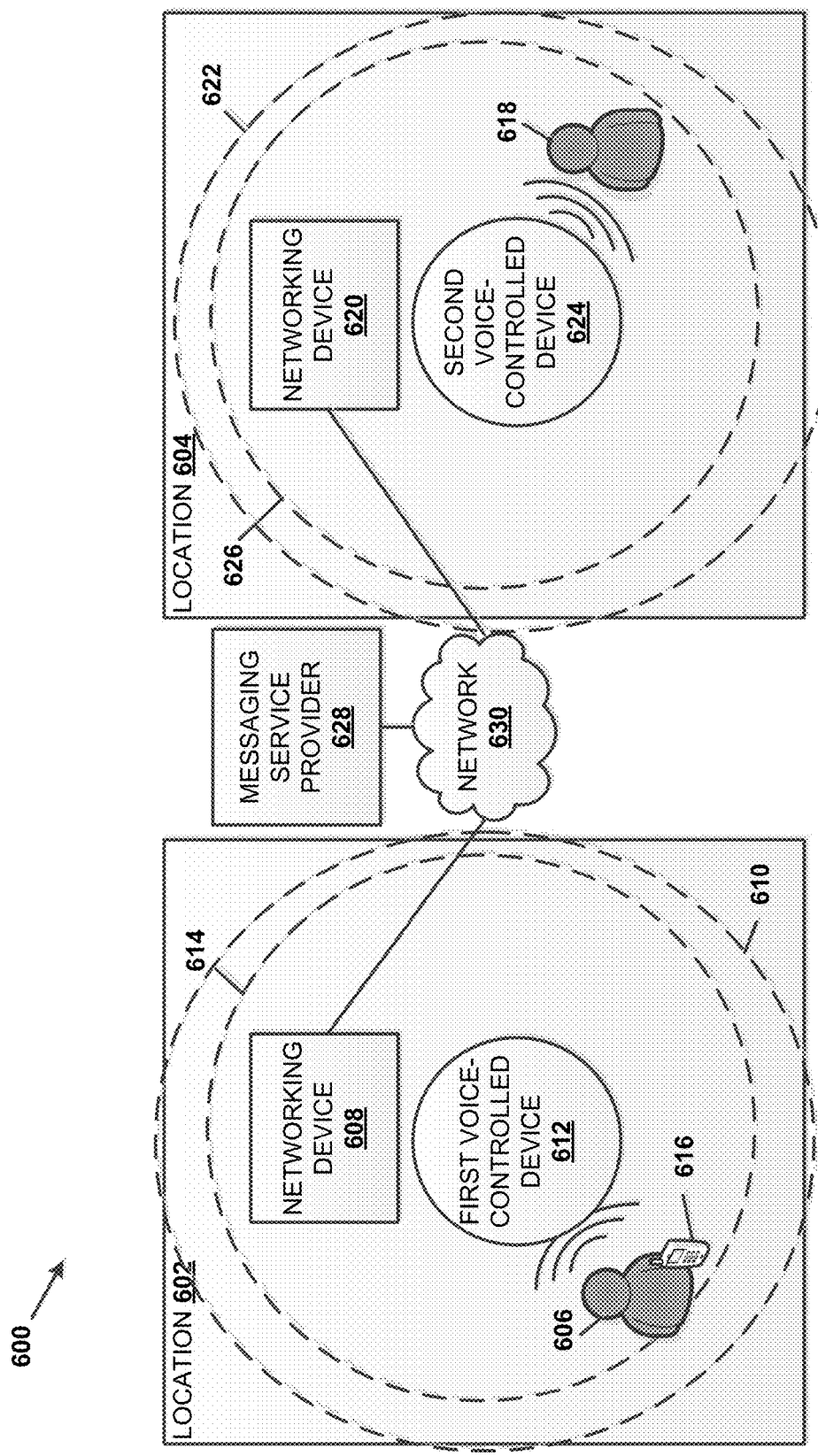
FIG. 6 is a block diagram illustrating an embodiment of an example use of the voice-controlled audio communication system over a network.

Referring now to FIGS. 5 and 6, block diagrams of specific examples of the performance of the method 100 are illustrated. Referring first to FIG. 5, a first location 500 may include a first user 502 and a second user 504, as well as a first voice-controlled device 506 and a second voice-controlled device 508 coupled together by a networking device 510. The networking device 510 may provide a first wireless signal 512 (e.g., Wi-Fi signal) that generally provides a wireless local area network (WLAN) for the location 500, and any of the first voice-controlled device 506, the second voice-controlled device 508, and any user devices (e.g., a first user device 514 and a second user device 520) may connect to the WLAN using techniques known in the art. The first voice-controlled device 506 may also provide a second wireless signal 516 via a wireless protocol such as Bluetooth®, BLE, NFC, IrDA, ANT, Zigbee, and other wireless protocols used for direct communication known in the art, and the second voice-controlled device 508 may provide a third wireless signal 518 similar to that provided by the first voice-controlled device 506. The second wireless signal 516 and third wireless signal 518 may allow for direct communication between the first voice-controlled device 506, the second voice-controlled device 508, the first user device 514, and second user device 520.

At block 102 of method 100, the first user 502 may be in proximity of the first voice-controlled device 508 such that a microphone of the first voice-controlled device 506 is configured to capture an audio command from the first user 502. The first user 502 may provide an audio command to the first voice-controlled device 506 that includes a command to send a first audio message to the second user 508. The first user 502 may provide a first audio message with the audio command, or in response to a prompt by the first voice-controlled device 506.

Referring now to FIG. 6, an audio communication system 600 is illustrated that may include a first location 602 and a second location 604. The first location 602 includes a first user 606, a first networking device 608 providing a WLAN via a first wireless signal 610, a first voice-controlled device 612 providing a second wireless signal 614, and a user device 616. The second location 604 includes a second user 618, a second networking device 620 providing a WLAN via a third wireless signal 622, a second voice-controlled device 624 providing a fourth wireless signal 626. The WLANs (and thus the devices included in the first location 602 and the second location 604) may be coupled each other and to a messaging service provider device 628 through a network 630. Similarly to the example illustrated in FIG. 5, at block 102 of method 100 the first user 606 may be in proximity of the first voice-controlled device 612 such that a microphone of the first voice-controlled device 612 is configured to detect an audio command from the first user 606. The first user 606 may provide an audio command to the first voice-controlled device 612 that includes a command to send a first audio message to the second user 618. The first user 606 may provide a first audio message with the audio command, or in response to a prompt from the first voice-controlled device 612 when the first voice-controlled device 612 is ready to record the first audio message.

The method 100 then proceeds to block 104 where an identity of the first user that provided the first audio message is determined. In an embodiment of block 104, the user identification engine 306 of the first voice-controlled device 300 may determine an identity of the first user. In some embodiments, the user identification engine 310 may work with the speech recognition module 306 to determine a voice print of the user from the audio command, and then compare the voice print to stored voice prints associated with user profiles in the user profile database 320 to determine the particular user. In other embodiments, the first voice-controlled system 300 may provide the voice print of the first user to the messaging service provider device 400, and the messaging service provider device 400 may determine the identity of the first user by comparing the voice print of the first user to voice prints associated with user profiles stored in the messaging system database 408. In yet other embodiments, the user identification engine 310 may determine the identity of the first user with data gathered by the identity detection device 326. For example, when the identity detection device 326 is a camera, the user identification engine 310 may utilize facial recognition techniques on images of the first user captured by the camera to determine the identity of the first user. In other examples, the voice-controlled device 300 may initialize a dialogue to identify and authenticate the first user via user credentials provided by the first user.

In yet another embodiment, the user identification engine 310 may operate with the first communication interface 316 and/or the second communication interface 318 to determine the identity of the first user. For example, the user profile database 320 may store associations between a user profile and a user device identifier of a user device such as the user devices 212, 214, and 226 of FIG. 2. The user device may be mobile phone, a wearable device, a tablet computing system, a laptop/notebook computing system, an implantable device, and any other user device that has a high probability of only being associated with a particular user or users. The user device identifier may be a token, character, string, or any identifier for differentiating a user device from another user device. For example, the user device identifier may be an internet protocol address, a network address, a media access control (MAC) address, a universally unique identifier (UUID) and/or any other identifier that can be broadcasted from a user device to the voice-controlled device 300. As such, when a user device comes into proximity of a low energy protocol wireless signal provided by the second communication interface 318, a user device identifier associated with the user device may be communicated to the second communication interface 318. The user identification engine 310 may then compare the received user device identifier to user device identifiers that are stored in the user profile database 320 and that are associated with user profiles. If the user device identifier of a user device matches a stored user device identifier associated with a user profile, then the user identification engine 310 may determine there is a high probability that the user of the user device is the user identified in that user profile. In some embodiments, the user identification engine 310 may use a combination of identification techniques described above to obtain a high enough confidence level to associate the first user with a stored user profile. While specific embodiments to determine the identity of the first user have been described, one of skill in the art in possession of the present disclosure will recognize that the first voice-controlled device 300 may determine the identity of the first user using other identifying methods without departing from the scope of the present disclosure.

Referring to the specific example illustrated in FIG. 5, the first user 502 may be in proximity of the first voice-controlled device 506 such that the first user device 514 receives the second wireless signal 516. The first user device 514 may be a mobile phone that is configured to operate according to a low energy wireless protocol, and the first voice-controlled device 506 may detect the user device 514 and receive a user device identifier when the user device 514 transmits/advertises its user device identifier (e.g., to establish a communication session with other devices operating according to the same low energy protocol.) The user identification engine of the first voice controlled device 506 may compare the user device identifier of the user device 514 to user device identifiers associated with user profiles in the user profile database to determine that the first user 502 is in proximity to the voice-controlled device 506.

Similarly, with reference to FIG. 6, the first user 606 may be in proximity of the first voice-controlled device 612 such that the first user device 616 receives the second wireless signal 614. The first user device 616 may be a wearable device that is configured to operate according to a low energy protocol, and the first voice-controlled device 612 may detect the presence of the wearable device and receive a user device identifier from the wearable device via communications provided using a low energy communication protocol. In this example, the first voice-controlled device 612 may provide the user device identifier to the messaging service provider device 628, and the messaging service provider device 628 may compare the detected user device identifier from the user device 612 to user device identifiers associated with user profiles stored at the messaging service provider device 628. When a user profile (e.g., a user profile of the first user 606) is determined to be associated with the user device identifier received from the first user device 616, then the messaging service provider device 628 may make an association between that user device profile and an identifier of the first voice-controlled device 612. The messaging service provider device 628 may also provide the user profile of the first user 606 to the first voice-controlled device 612, or provide the first voice-controlled device 612 an indication as to the identity of the first user 606 so that the first voice-controlled device 612 may access a locally stored user profile associated with the first user 606.

The method 100 then proceeds to block 106 where an identity of the second user is determined. In an embodiment of block 106, the first voice-controlled device 300 may determine the identity of the second user based on the audio command provided by the first user. However, it should be recognized that first voice-controlled device 300 may provide the audio command to the messaging service provider device 400 for determination of the identity of the second user, and thus the messaging service provider device 400 may perform any of the functionality discussed below. In an embodiment, the first voice-controlled device 300 may identify the second user from potential second user profiles stored in the user profile database 320 and/or the messaging system database 408. When determining the identity of the second user from the audio command, the first-voice-controlled device 300 may need to satisfy a confidence level before determining that the second user has been identified in the audio command. For example, the audio command may include a unique identifier of the second user that specifically indicates to the first voice-controlled device 300 which user of the voice-controlled audio communication system 100 is to receive the audio message. In such situations, the first voice-controlled device 300 may have a very high confidence level for the second user identified in the audio command because the search of the user profiles with the unique identifier may only provide in a single second user result. In another example, the audio command may not include a unique identifier for the second user, and instead may only include a first name and/or last name. The first voice-controlled device 300 may then determine that the user profile database 320 and/or the messaging system database 408 only has one user profile associated with that first name and/or last name, which may result in a high confidence level that the first voice-controlled device 300 has accurately identified the second user. However, the confidence level may be lower than the example where the audio command includes a unique identifier because there is a possibility that the second user identified by the first name and/or last name in the audio command is not a user of the audio communication system 100 but has the same name as someone who is a user of the audio communication system 100.

In the example where a first and/or last name are provided in the audio message, the first voice-controlled device 300 may determine that there is more than one user profile associated with that first and/or last name. The first voice-controlled device 300 may then determine a confidence level for each of those user profiles (which may be identical confidence levels to each other, and lower than the confidence level in previous example where only one user profile was associated with the first name and/or last name). If the confidence level is below a threshold that allows the first voice-controlled device 300 to provide the first audio message to the second user, then the first voice-controlled device 300 may use other information to determine which user profile is associated with the user identified in the audio command (e.g., by the first name and/or last name). For example, the audio message may be in a first language, and one of the user profiles initially identified may indicate that the user of that user profile speaks a second language, and thus the voice controlled device 300 may determine that that user is likely not the user identified in the audio message by the first name and/or the last name. As another example, the first voice-controlled device 300 may consider the location of the users of the identified user profiles in comparison to the location of the first voice-controlled device, and users that are located near the first voice-controlled device be associated with a higher confidence level than users that are further away.

In an embodiment, the determination of the second user identified in the audio command may be based on the identity of the first user determined above. In addition to any information regarding the identity of the second user in the audio command and/or audio message, the first voice-controlled device 300 may use the identity of the first user to determine the confidence level that the second user is identified in the audio command. For example, the user profile of the first user may include a contacts list, a first user's social network, a history of second users the first user has frequently contacted, and/or other databases of associations between the first user and potential second users. The first voice-controlled device 300 may use the second users associated with the first user by the various databases determine with more granularity which of the second users the first user is referring to in the audio command. Using the identity of the first user to determine the second user may be particularly useful when the audio command includes very little information about the second user such as, for example, only a first name. The first voice-controlled device 300 may determine that the first name is the same as a frequently contacted user, and may then determine with a high confidence level that the frequently contacted user is the second user identified in the audio command.

After the first voice-controlled device 300 determines a confidence level from the information available to the first voice-controlled device 300, the first voice-controlled device 300 may then determine whether the confidence level satisfies a threshold that allows for the provision of the audio message to the second user that was identified. The confidence level may be a predetermined confidence level and/or may be adjustable by the first user (e.g., in the first user's user profile). In some embodiments, there may also be more than one confidence level for various types of messages. For example, an audio message that is an advertisement and/or that is directed to more than one second user may have a lower confidence level threshold because it is less personal in nature than an audio message that is directed to a single second user. In some embodiments, the speech recognition engine 306 may analyze the audio message to determine the sensitivity of the content of the audio message and, in response, determine the threshold confidence level. For example, an audio message that just states "Hello" may have a lower confidence threshold than an audio message that provides specific dates, times, and locations. In addition, some audio messages that are directed to or include references to particular users may be automatically associated with a higher confidence level threshold.

If the determined confidence level is below the threshold confidence level, the first voice-controlled device 300 may prompt the first user for more information about the second user. For example, the first voice-controlled device may prompt the first user by generating an audio signal with the audio engine 308 that produces sound through the speakers 324 that indicates that the first voice-controlled device 300 needs more information about the second user. Such prompts may ask specific questions such as the location of the second user, the last name of the second user, an e-mail address of the second user, a middle name of the second user, and other identifying information that allows for more accurately determinations of the identity of the second user. If the second user does not exist or the information provided cannot determine the identity of the second user with high enough confidence, the first voice-controlled device 300 may alert the first user that the message cannot be provided to the second user. If the first voice-controlled device 300 identifies the second user at a confidence level that is above the threshold confidence level, then the method 100 may continue at block 108 as discussed below.

Referring to the specific example illustrated in FIG. 5, the first voice-controlled device 506 may determine that the second user identified by the first user 502 in the audio command is the second user 504 according to any of the techniques described above. Referring to the specific example illustrated in FIG. 6, the first voice-controlled device 612 and/or the messaging service provider device 628 may determine the second user identified by the first user 606 in the audio command is the second user 618 according to any of the techniques described above.

The method 100 then proceeds to block 108 where the first audio message is provided to the second user. In an embodiment of block 108, the first voice-controlled device 300 may provide the first audio message to the second user. For example, the first voice-controlled device 300 may monitor the surrounding location and determine when the second user is in proximity to the first voice-controlled device 300. The user identification engine 310 may determine the identity of a user in proximity to the first voice-controlled device 300 in a similar manner as described above for determining the identity of the first user in block 104 of method 100. When the user identification engine 310 detects the second user, the audio engine 308 of the first voice-controlled device 300 may retrieve the first audio message from memory and generate an audio signal such that the speaker 324 outputs the audio message.

In another embodiment, the first voice-controlled device 300 may be one of a plurality of voice-controlled devices of a LAN such as, for example, the LAN 202 of FIG. 2. For example, the first voice-controlled device 300 may be the first voice-controlled device 204 and a second voice-controlled device may be the second voice-controlled device 206, and the first voice-controlled device 204 may receive the first audio message from the first user and determine the second user that is to receive the first audio message. The first voice-controlled device 204 may then store the first audio message locally and/or transmit the first audio message to the second voice-controlled device 206 (or any other voice-controlled device of the plurality of voice-controlled devices in the LAN 202.) The first voice-controlled device 204 may also associate the identity of the second user with the first audio message. As such, when the second user is determined to be in proximity to the second voice-controlled device 206, the second voice-controlled device 206 may play the first audio message to the second user.

In another embodiment, the second voice-controlled device 206 may detect the second user is in proximity to the second voice-controlled device 206 and transmit a notification to the first voice-controlled device 204 that the second user is in proximity to the second voice-controlled device 206.

The first voice-controlled device 204 may then determine whether there are any audio messages stored at the first voice-controlled device 204 for the second user. If there is an audio message stored at the first voice-controlled device 204 for the second user, then the first voice-controlled device 204 may transmit the audio message to the second voice-controlled device 206 so that the second voice-controlled device 206 may play the audio message for the second user.

Referring to the specific example illustrated in FIG. 5, the second voice-controlled device 508 may determine that the second user 504 is in proximity to the second voice-controlled device 508 and, in response, may play the first audio message that is stored locally to the second user 504. In another embodiment, the second voice-controlled device 508 may send a notification to the first voice-controlled device 506 that the second user 504 is in proximity to the second voice-controlled device 508, and the first voice-controlled device 506 may transmit the first audio message to the second voice-controlled device 508 to play to the second user 504.

In another embodiment of the voice-controlled audio communication system 100, the first voice-controlled device 300 may transmit the first audio message received from the first user to the messaging service provider device 400. The first voice-controlled device 300 and/or the messaging service provider device 400 may then determine the identity of the second user that is to receive the first audio message as discussed above, and the first audio message may be associated with the identity of the second user at the messaging service provider device 400. The messaging service provider device 400 may then receive notifications from the various voice-controlled devices in the audio communication system 100 as to which users come into proximity of each respective voice-controlled device and which users leave the proximity of each respective voice-controlled device. The messaging service provider device 400 may store associations between user identifier(s) of user devices and voice-controlled device identifier(s) of voice-controlled device(s) when user devices are located in proximity of those voice controlled devices in the messaging system database 408, and may update those associations in real-time as users enter, move about, and leave the voice-controlled audio communication system 100. When the messaging service provider device 400 receives the first audio message that is associated with the second user, the messaging service provider device 400 may compare the identifier of the second user to the associations of user identifiers and voice-controlled device identifiers stored in the messaging system database 408. If the identifier of the second user matches the identifier of a user identifier associated with a voice-controlled device identifier of a voice controlled device, then the messaging service provider device 400 may provide the first audio message to that voice-controlled device. If the identifier of the second user does not match any user identifiers in the stored associations with the voice controlled device identifiers, then the messaging service provider device 400 may store or otherwise queue the first audio message until the messaging service provider device 400 receives a notification from a voice-controlled device that the voice-controlled device has detected that the second user is in proximity of that voice-controlled device. The messaging service provider device 400 may then transmit the first audio message to the voice-controlled device that has detected the second user, and that voice-controlled device may then play the first audio message to the second user.

Referring to the specific example in FIG. 6, the second voice-controlled device 624 and/or the messaging service provider 628 may determine that the second user 618 is in proximity to the second voice-controlled device 624 according to techniques described above, and the messaging service provider 628 may provide the first audio message to the second voice-controlled device 624. The second voice-controlled device 624 may then output the audio message to the second user 618 through the speakers of the second voice-controlled device 624.

In an embodiment, the audio command, the user profile of the first user, the user profile of the second user, the first audio message, the application engine 304, and/or the messaging system engine 404 may include instructions that provide various conditions that may need to be satisfied before the first audio message is provided to the second user. For example, conditions for playing an audio message to a user may be based on a confidence level that the identified second user in proximity to the second voice-controlled device is actually the second user, that the audio message is being played at a particular date and/or time, that the audio message is being played by a specific voice-controlled device, that a number of users in proximity to the voice-controlled device in addition to the second user is below a threshold number, that the second user is in a specific position in relation to the voice-controlled device providing the first audio message, that the audio message is being played during particular environmental factors (e.g., weather), and/or any other condition that may be placed on the delivery of an audio message. Additionally, differing conditions may result in alternative messages being provided to the second user depending on particular condition(s) being satisfied. For example, the first audio message may include instructions to provide a first message to the second user if the second user is in proximity a voice-controlled device before a first time, and a second message if the second user is in proximity to a voice-controlled device after the first time.

In an embodiment, a condition to be satisfied before the first message is provided to the second user may be based on the position of the second user within the surrounding location of a voice-controlled device 300. Determining the location of a user may be particularly useful when more than one voice-controlled device 300 detects the presence of the second user within a particular location. Referring to the example of FIG. 5, the second user 504 may enter the location 500 with the second user device 520, and the second user device 520 may connect to the networking device 510 and provide a user device identifier to establish a connection with the LAN defined by the first wireless signal 512. The networking device 510 may then provide the user device identifier to the first voice-controlled device 506 and the second voice-controlled device 508, which may use that user identifier to determine the identity of the second user and that there is an audio message stored for that second user. Because the second user was identified by a user device identifier through the first wireless signal 512 (e.g., a WLAN signal), it may not be clear which of the voice-controlled devices 506 and 508 is to provide the first audio message. In such situations, the first-voice-controlled device 506 and the second voice-controlled device 508 may communicate with each other to determine, via information retrieved using their respective user location engines 312, which voice-controlled device is going to provide the message to the second user 504. For example, the second voice-controlled device 508 may detect a broadcast of an identifier for a low energy communication protocol coming from the user device 520 (e.g., the second user coming in range of the third wireless signal 518) while the first voice-controlled device 506 does not detect the broadcast of an identifier. The first voice-controlled device 506 and the second voice-controlled device 508 may determine that second voice-controlled device 508 will provide the audio message to the second user 504 because the second user device 520 is closer to the second voice-controlled device 508.

However, in other embodiments, detection of a low energy communication protocol may not mean that the second user is in audio range of the second voice-controlled device 508 (e.g., the user could be in another room.) Therefore, the user location engine 312 of the second voice-controlled device 508 may use more granular techniques to determine the location of the second user 506. For example, the second voice-controlled device 508 may include a plurality of microphones and/or may operate in conjunction with the microphones of the first voice-controlled device 506 and an audio signal based on sound generated from the second user 504. In these instances, the user location engine 312 may utilize time-difference-of-arrival (TDOA) techniques to determine a distance of the second user 504 from the first and second voice-controlled devices. The user location engine 312 may then cross-correlate the times at which different microphones received the audio to determine a location of the second user 504. In another example, the second voice-controlled device 508 may include an identity detection device 326 such as a camera that captures images of the location 500 surrounding the second voice-controlled device 508. The user location engine 312 may then analyze these images to identify a location of the second user 504, and based on the location of the second user 504, the second voice-controlled device 508 may determine whether to provide the first audio message or engage the second user 504 to determine whether the second user 504 wants to hear the audio message. In an embodiment, based on location information gathered according to the techniques described above, the audio engine 308 may determine how to output the audio message (e.g., at a particular volume level, via a directional speaker, etc.) to the second user 504.

In an embodiment, the voice-controlled device providing the first audio message to the second user may transmit the first audio message to a second user device of the second user so that the second user device may play the audio message. The user device (e.g., the user device 212, the user device 214, or the user device 226) may be associated with the second user and coupled to the voice-controlled device via a LAN or through a low energy communication protocol connection. The user device may include an application that is configured to communicate with the voice-controlled audio communication system 100 and perform at least part of the functionality described above. The voice-controlled device may transmit the first audio message to the user device associated with the second user, and the application on that user device may cause the user device to play the first audio message to the second user. Transmitting the first audio message to the user device to play the first audio message to the second user may be particularly useful where the voice-controlled device that detects the second user is in a public setting and/or other users have been detected by that voice-controlled device at the same time that the second user is detected by that voice-controlled device. Therefore, the second user may listen to the audio message privately through their user device (which may be a tablet computing system, wearable computing system, mobile phone, and/or other user devices that are configured to communicate with a voice-controlled device.)

The method 100 may then proceed to block 110 where a second audio message for the first user is received. In an embodiment of block 110, the first voice-controlled device 300 may receive a second audio message from a second voice-controlled device within the same local area network or over the network 210. The second audio message may be a response message from the second user in response to the first audio message that was provided by the first user for that second user. In an embodiment, the second audio message may be a message from another user besides the second user of the voice-controlled audio communication system 100. To receive the second audio message, the first voice-controlled device 300 may have determined that the first user is still in proximity to the first voice-controlled device 300 and/or the association of the identifier of the first user with the identifier of the first voice-controlled device may still indicate that the first user is still in proximity to the first voice-controlled device 300. Once the second audio message is received by the first voice-controlled device 300, and if all other conditions are satisfied for providing the second audio message to the first user, then the method 100 may continue at block 112.

At block 112, the second audio message is provided to the first user. In an embodiment, the audio engine 308 of the first voice-controlled device 300 may generate an audio signal on the speaker 324 to output the second audio message to the location surrounding the first voice-controlled device 300. In some embodiments, a condition may require that the first voice-controlled device transmit the second audio message to a user device of the first user such that the user device plays the second audio message to the first user, similarly as described above.

Thus, systems and methods have been described that provide for a voice-controlled audio communication system. The voice-controlled audio communication system and methods provide for communication with voice-controlled devices such that a user may provide a natural language audio command to a voice-controlled device and include an audio message for another user. The voice-controlled device and/or a messaging service provider device may determine the identity of the user that is to receive the audio message based on the audio command, and determine whether the user to receive the message is present at any voice-controlled device that is part of the voice-controlled audio communication system. As such, voice-controlled devices such as smart speakers, appliances, and other home automated voice-controlled devices may be used to facilitate communication between two or more users without the use of a phone, and without the need for the voice-controlled device to be unique to a single user.

Figure 7:
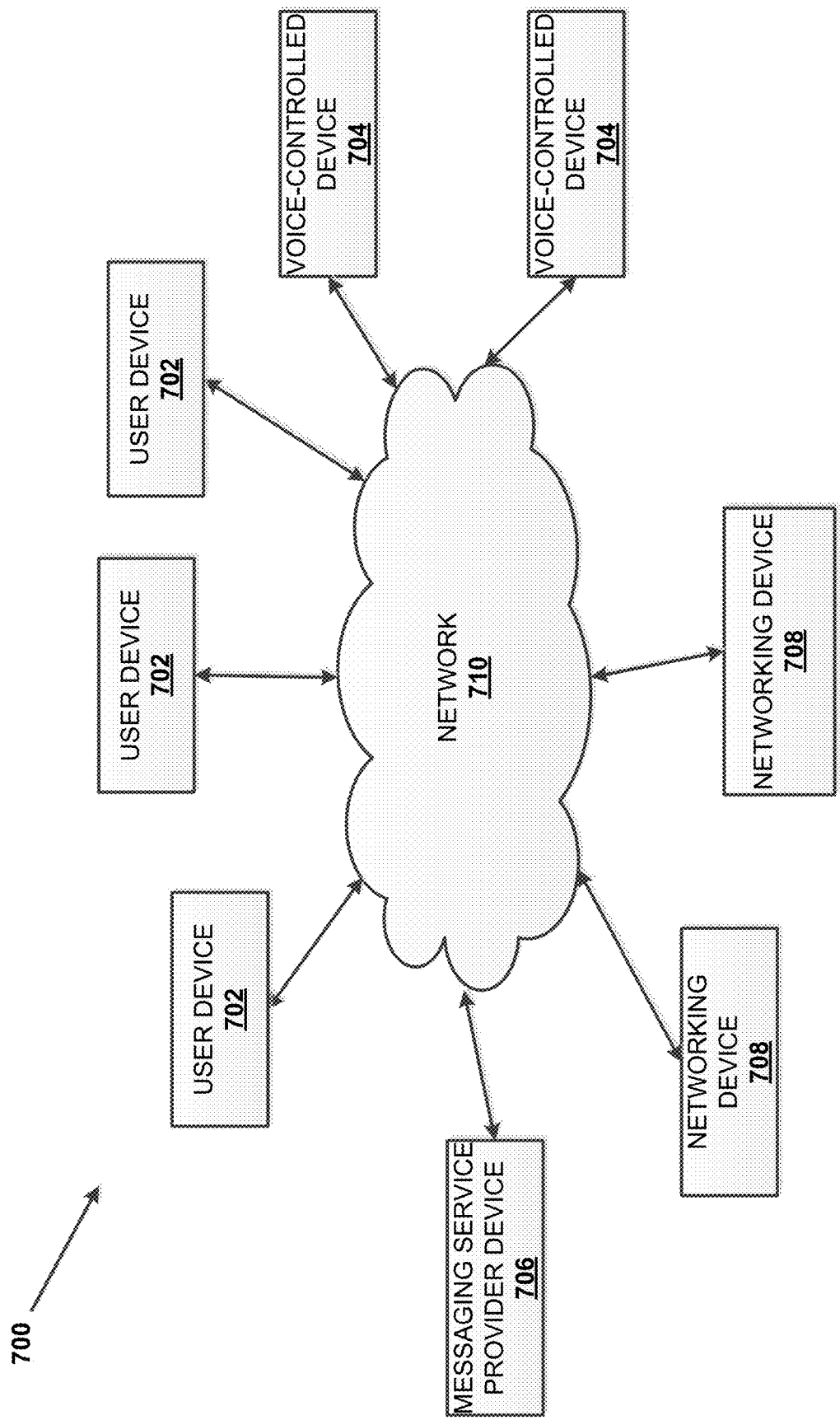
FIG. 7 is a schematic view illustrating an embodiment of a networked system.

Referring now to FIG. 7, an embodiment of a network-based system 700 for implementing one or more processes described herein is illustrated. As shown, network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 7 includes a plurality of user devices 702, a plurality of voice-controlled devices 704, a messaging service provider device 706, and a plurality of networking devices 708 in communication over a network 710. Any of the user devices 702 may be any of the user devices discussed above and operated by the users discussed above. The voice-controlled devices 704 may be the voice-controlled devices discussed above and may be operated by the users discussed above. The messaging service provider device 706 may be the messaging service provider device 400 discussed above and may be operated by a messaging service provider such as, for example, PayPal Inc. of San Jose, Calif. The networking devices 708 may be the networking devices discussed above and may be operated by the users and/or network administrators.

The user devices 702, voice-controlled devices 704, messaging service provider device 706, and networking devices 708 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The user device 702 may be implemented using any appropriate combination of hardware and/or software configured for wired and/or wireless communication over network 710. For example, in one embodiment, the user device 702 may be implemented as a personal computer of a user in communication with the Internet. In other embodiments, the user device 702 may be a smart phone, personal digital assistant (PDA), laptop computer, and/or other types of computing devices.

The user device 702 may include one or more browser applications which may be used, for example, to provide a convenient interface to permit the user to browse information available over the network 710. For example, in one embodiment, the browser application may be implemented as a web browser configured to view information available over the Internet.

The user device 702 may also include one or more toolbar applications which may be used, for example, to provide user-side processing for performing desired tasks in response to operations selected by the user. In one embodiment, the toolbar application may display a user interface in connection with the browser application.

The user device 702 may further include other applications as may be desired in particular embodiments to provide desired features to the user device 702. In particular, the other applications may include a payment application for payments assisted by a payment service provider through the messaging service provider device 706. The other applications may also include security applications for implementing user-side security features, programmatic user applications for interfacing with appropriate application programming interfaces (APIs) over the network 710, or other types of applications. Email and/or text applications may also be included, which allow the user to send and receive emails and/or text messages through the network 710. The user device 702 includes one or more user and/or device identifiers which may be implemented, for example, as operating system registry entries, cookies associated with the browser application, identifiers associated with hardware of the user device 702, or other appropriate identifiers, such as a phone number. In one embodiment, the user identifier may be used by the voice-controlled devices 704, the messaging service provider device 706 and/or the networking devices 708 to associate the user with a particular user profile as further described herein.

Figure 8:
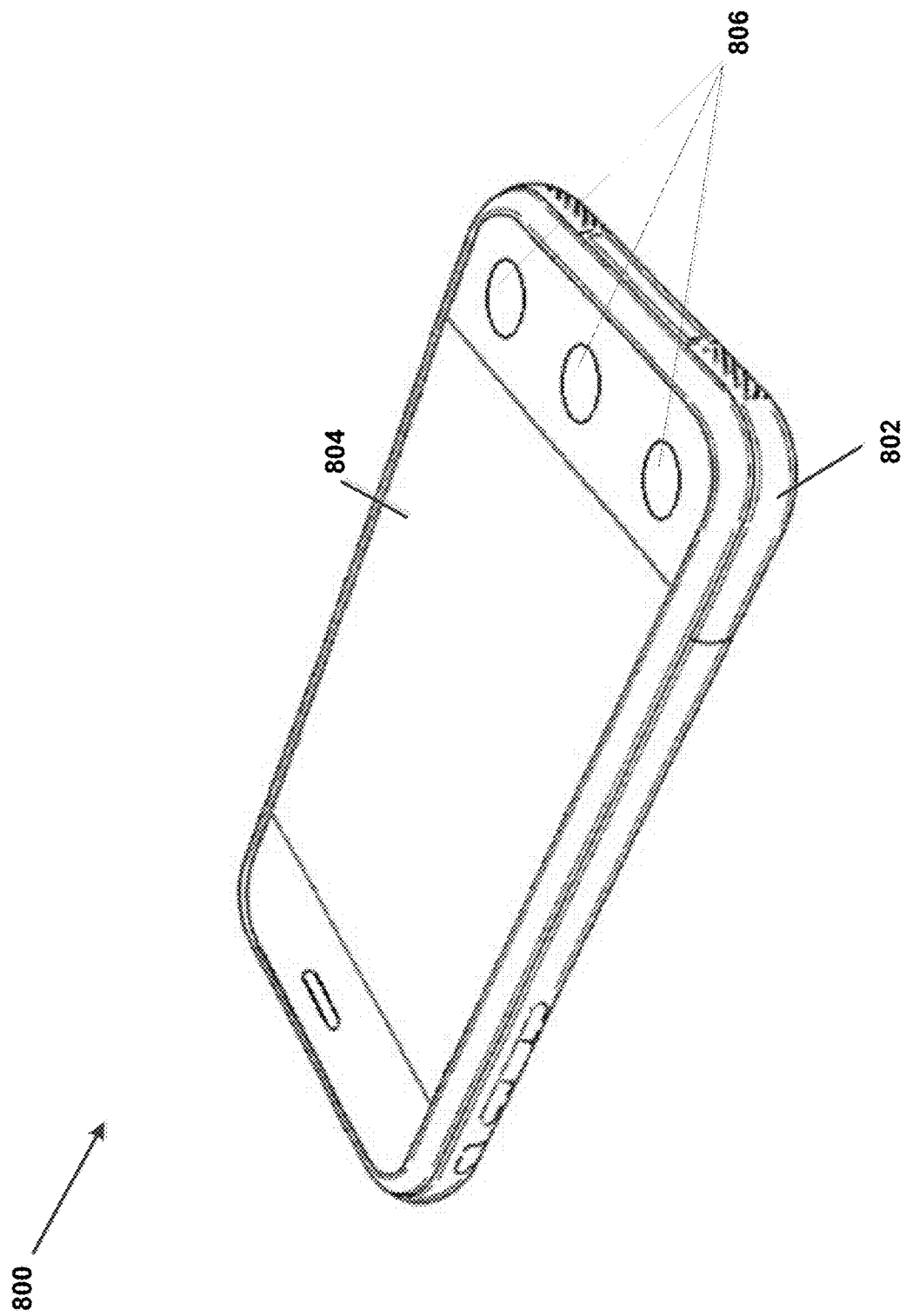
FIG. 8 is a perspective view illustrating an embodiment of a user device.

Referring now to FIG. 8, an embodiment of a user device 800 is illustrated. The user device 800 may be the user devices 212, 214, 226, 514, 520, 616, and/or 702. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 9:
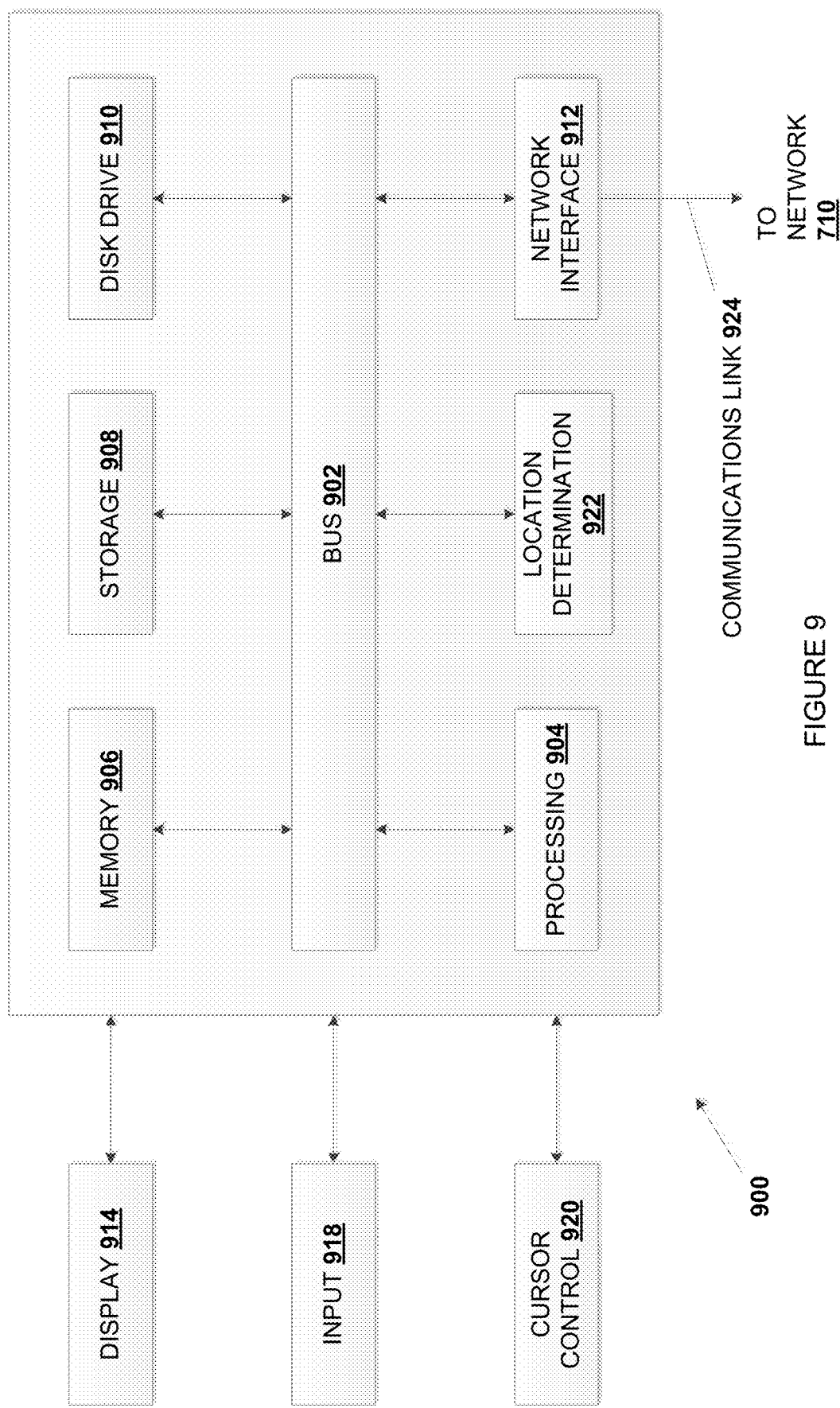
FIG. 9 is a schematic view illustrating an embodiment of a computer system.

Referring now to FIG. 9, an embodiment of a computer system 900 suitable for implementing, for example, the user devices 212, 214, 226, 514, 520, 616, and/or 702, the voice-controlled devices 204, 206, 222, 300, 506, 508, 612, 624, and/or 704, the messaging service provider device 216, 400, 628, 706, and/or the networking devices 208, 224, 510, 608, 620, and 708, is illustrated. It should be appreciated that other devices utilized by users, and messaging service providers in the audio communication system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user devices, the voice-controlled device(s), the messaging service provider device, and/or the networking device(s). Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 710 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
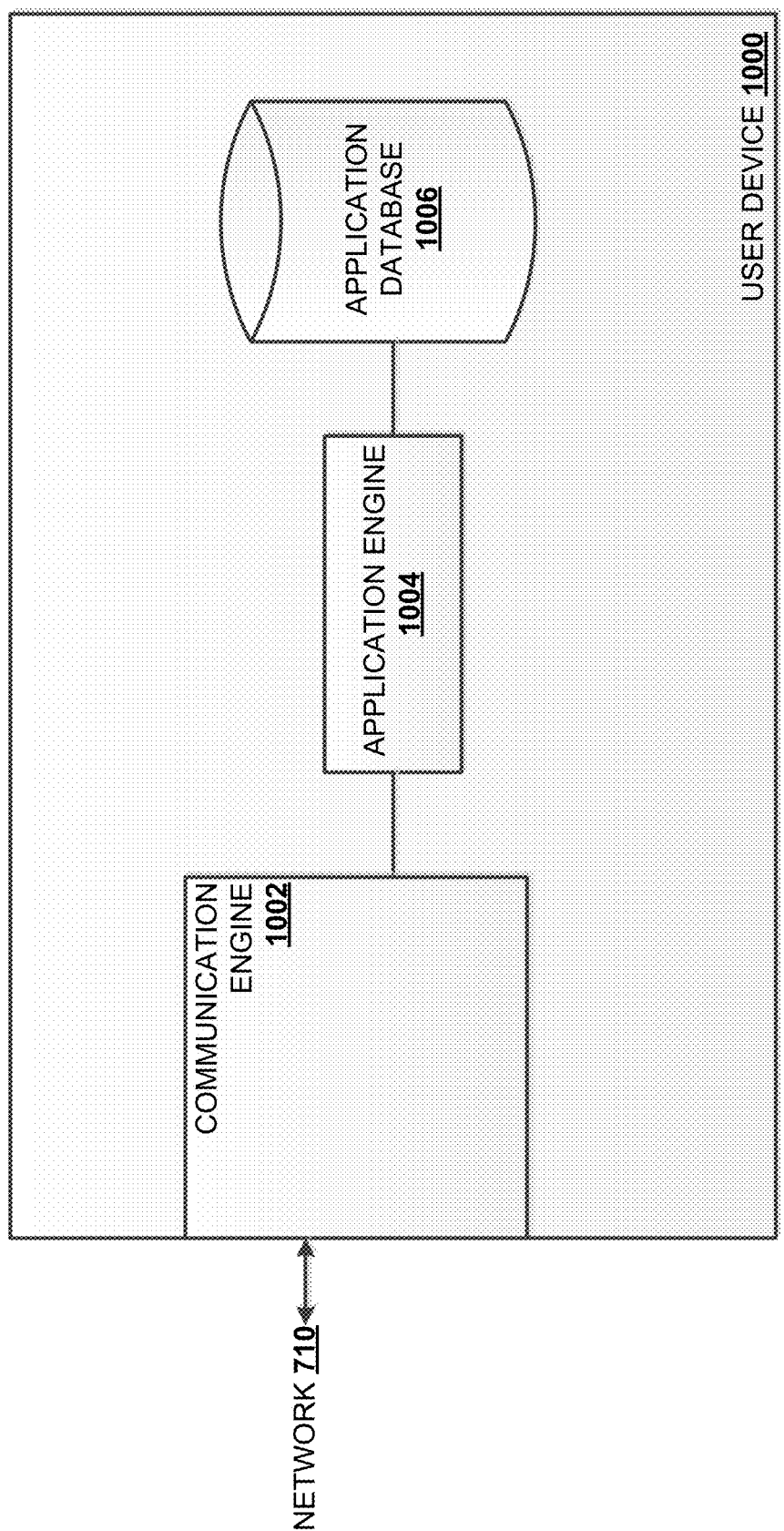
FIG. 10 is a schematic view illustrating an embodiment of a user device.

Referring now to FIG. 10, an embodiment of a user device 1000 is illustrated. In an embodiment, the user device 1000 may be the user devices 212, 214, 226, 514, 520, 616, 702, and/or 800. The device 1000 includes a communication engine 1002 that is coupled to the network 710 and to an application engine 1004 that is coupled to an application database 1006. The communication engine 1002 may be software or instructions stored on a computer-readable medium that allows the device 1000 to send and receive information over the network 710 and/or to other user devices, networking devices, and/or voice-controlled device directly through a low energy communication protocol. The application engine 1004 may be software or instructions stored on a computer-readable medium that is operable to receive audio messages and audio commands and provide any of the other functionality that is discussed above. While the database 1006 has been illustrated as located in the user device 1000, one of skill in the art will recognize that it may be connected to the application engine 1004 through the network 710 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users providing messages to other users; however, a user or consumer can interact with any type of recipient, including charities and merchants by providing payments through the voice-controlled audio communication system. The payment does not have to involve a purchase, but may be a loan, a charitable contribution, a gift, etc. Thus, users as used herein can also include charities, individuals, and any other entity or person receiving a payment from another user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A voice-controlled system, comprising:
a first communication interface that is configured to provide wireless communications with a user device;
a non-transitory memory; and
one or more hardware processors coupled to the non-transitory memory and the first communication interface, wherein the one or more hardware processors are configured to execute instructions from the non-transitory memory to cause the system to perform operations comprising:
receiving, via the first communication interface, a user device identifier for the user device when the user device is at a first position in proximity to the first communication interface;
determining an identity of a first user based on the user device identifier;
determining, using the identity of the first user, that a first audio message that is destined for the first user is stored; and providing, via an audio output device coupled to the one or more hardware processors, the first audio message while the first user of the user device is at a second position in proximity to the audio output device that satisfies a position first condition.

2. The voice-controlled system of claim 1, further comprising:
an audio input device coupled to the one or more hardware processors, wherein the operations further comprise:
receiving, via the audio input device from the first user, a second audio message and an audio command to provide the second audio message to a second user;
determining an identity of the second user based on the audio command; and
providing the second audio message to the second user based on the identity of the second user.

3. The voice-controlled system of claim 2, wherein the providing the second audio message to the second user includes:
determining that a third position of the second user in proximity to the audio output device satisfies a position second condition, wherein the second audio message is provided to the second user via the audio output device based on the position second condition being satisfied.

4. The voice-controlled system of claim 2, further comprising:
a second communication interface configured to communicate with a network and that is coupled to the one or more hardware processors, wherein the providing the second audio message to the second user includes:
transmitting the second audio message and an identifier of the second user over the network to a voice-controlled device, wherein the voice-controlled device determines the second user is at a third position in proximity to the voice-controlled device that satisfies a position second condition and, in response, provides the second audio message via the audio output device of the voice-controlled device to the second user.

5. The voice-controlled system of claim 2, further comprising:
- a second communication interface configured to communicate with a network and that is coupled to the one or more hardware processors, wherein the providing the second audio message to the second user includes:
  - providing, to a messaging service provider device via the network, the second audio message and the identity of the second user;
  - receiving the identifier of the second user from a voice-controlled device; and
  - providing the second audio message to the voice-controlled device when the second user is at a third position in proximity to the voice-controlled device.

6. The voice-controlled system of claim 2, wherein the audio command includes a condition to be satisfied before providing the second audio message to the second user, and wherein the operations further comprise:
- determining the condition has been satisfied prior to providing the second audio message to the second user.

7. The voice-controlled system of claim 1, wherein the operations further comprise:
- determining a third position of a second user in proximity to the audio output device satisfies a position second condition prior to providing the first audio message via the audio output device and while the first user of the user device is at the second position that satisfies the position first condition, wherein the providing, via the audio output device, the first audio message while the first user of the user device is at the second position in proximity to the audio output device that satisfies the position first condition is performed when the second user is at a fourth position that no longer satisfies the position second condition.

8. The voice-controlled system of claim 1, further comprising:
- a second communication interface configured to communicate with a network and that is coupled to the one or more hardware processors, wherein the determining, using the identity of the first user that is based on the user device identifier received via the first communication interface, that the first audio message is stored in a database that is destined for the first user includes:
  - providing, via the network in response to determining that the user device is at the first position in proximity to the first communication interface, a notification to a messaging service provider device that the first user is at the first position in proximity to the first communication interface; and
- receiving a second audio message for the first user from the messaging service provider device in response to providing the notification.

9. The voice-controlled system of claim 1, wherein the first audio message is associated with a condition to be satisfied in addition to the position first condition being satisfied before being provided to the first user and wherein the operations further comprise:
- determining the condition has been satisfied; and
- providing the first audio message to the first user based on the condition being satisfied.

10. A messaging service provider system, comprising:
- a messaging database;
- a non-transitory memory; and
- one or more hardware processors coupled to the non-transitory memory and the messaging database, wherein the one or more hardware processors are configured to execute instructions from the non-transitory memory to cause the system to perform operations comprising:
  - receiving, via a network from a first voice-controlled device, a user device identifier for a user device when the user device is at a first position in proximity to the first voice-controlled device;
  - determining an identity of a first user based on the user device identifier;
  - determining, using the identity of the first user that is based on the user device identifier that a first audio message is stored in the messaging database that is destined for the first user; and
  - providing, via the network, the first audio message while the first user of the user device is at a second position in proximity to the first voice-controlled device that satisfies a position first condition.

11. The messaging service provider system of claim 10, wherein the operations further comprise:
- receiving, via the network from the first voice-controlled device, a second audio message from the first user and an audio command to provide the second audio message to a second user;
- determining an identity of the second user based on the audio command to provide the second audio message to the second user; and
- storing the second audio message in the messaging database.

12. The messaging service provider system of claim 11, wherein the operations further comprise:
- determining a condition has been satisfied; and
- in response to the condition being satisfied, providing the second audio message stored in the messaging database to the second user based on the identity of the second user.

13. The messaging service provider system of claim 11, wherein the operations further comprise:
- determining that the second user is at a third position in proximity to the first voice-controlled device that satisfies a position second condition, and in response, providing, via the network to the first voice-controlled device, the second audio message to the second user.

14. The messaging service provider system of claim 11, wherein the operations further comprise:
- determining that the second user is at a third position in proximity to a second voice-controlled device that satisfies a position second condition, and in response, providing, via the network to the second voice-controlled device, the second audio message to the second user.

15. The messaging service provider system of claim 10, wherein the operations further comprise:
- receiving, via the network from the first voice-controlled device, a notification that the first user is at the second position in proximity the first voice-controlled device that satisfies the position first condition prior to the providing, via the network, the first audio message while the first user of the user device is at the second position in proximity to the first voice-controlled device that satisfies the position first condition.

16. A messaging service provider system, comprising:
- a non-transitory memory; and
- one or more hardware processors coupled to the non-transitory memory and a messaging database, wherein the one or more hardware processors are configured to execute instructions from the non-transitory memory to cause the system to perform operations comprising:

receiving, via a network from a first voice-controlled device, a first audio message and an audio command to provide the first audio message to a second user and a user device identifier for a user device associated with a first user when the user device is at a first position in proximity to the first voice-controlled device;

determining an identity of the first user based on the user device identifier;

determining an identity of the second user based on the audio command to provide the first audio message to the second user and the identity of the first user;

providing the first audio message to the second user;

determining, using the identity of the first user, that a second audio message is stored that is destined for the first user; and providing the second audio message to the first voice-controlled device while the first user of the user device is at a second position in proximity to the first voice-controlled device that satisfies a position first condition.

17. The messaging service provider system of claim 16, wherein the operations further comprise:

determining a third user is at a third position in proximity to the first voice-controlled device prior to providing the second audio message to the first voice-controlled device and while the first user of the user device is at the second position in proximity to the first voice-controlled device that satisfies the position first condition, wherein the providing the second audio message to the first voice-controlled device while the first user of the user device is at the second position in proximity to the first voice-controlled device that satisfies the position first condition is performed when a position of the third user no longer satisfies the position first condition.

18. The messaging service provider system of claim 16, wherein the operations further comprise:

monitoring a plurality of voice-controlled devices for an identifier associated with the second user that indicates the second user is at a third position in proximity to a voice-controlled device of the plurality of voice-controlled devices that satisfies a position second condition;

receiving the identifier of the second user from the voice-controlled device; and providing the first audio message to the voice-controlled device when the second user is at the third position in proximity to the voice-controlled device that satisfies the position second condition.

19. The messaging service provider system of claim 16, wherein the audio command includes a condition to be satisfied before providing the first audio message to the second user, and wherein the operations further comprise:

determining the condition has been satisfied; and providing the first audio message to the second user.

20. The messaging service provider system of claim 16, wherein the providing the first audio message to the second user includes:

transmitting the first audio message and an identifier of the second user over the network to a second voice-controlled device, wherein the second voice-controlled device determines the second user is at a third position in proximity to the second voice-controlled device that satisfies a position second condition and, in response, provides the first audio message via an audio output device of the second voice-controlled device to the second user.

\* \* \* \* \*